G. T. AYER.
CURRYCOMB.
APPLICATION FILED MAR. 3, 1919.

1,302,755.

Patented May 6, 1919.

Inventor
Gip. T. Ayer
Attorneys

UNITED STATES PATENT OFFICE.

GIPSON TAYLOR AYER, OF DADE CITY, FLORIDA.

CURRYCOMB.

1,302,755. Specification of Letters Patent. Patented May 6, 1919.

Application filed March 3, 1919. Serial No. 280,335.

*To all whom it may concern:*

Be it known that I, GIPSON T. AYER, a citizen of the United States, residing at Dade City, in the county of Pasco and State of Florida, have invented new and useful Improvements in Currycombs, of which the following is a specification.

This invention relates to curry-combs having a series of serrated bars supported by a frame which is provided with a handle, and the invention has for its object to provide a device of this kind which is practically self-cleaning, the bars being so mounted that hair, dirt and trash is effectually prevented from accumulating thereon.

Figure 1:
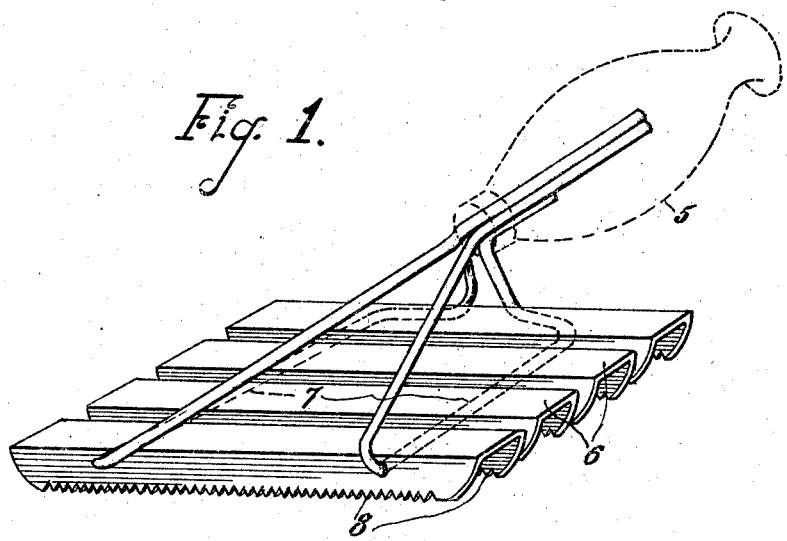
Figure 2:
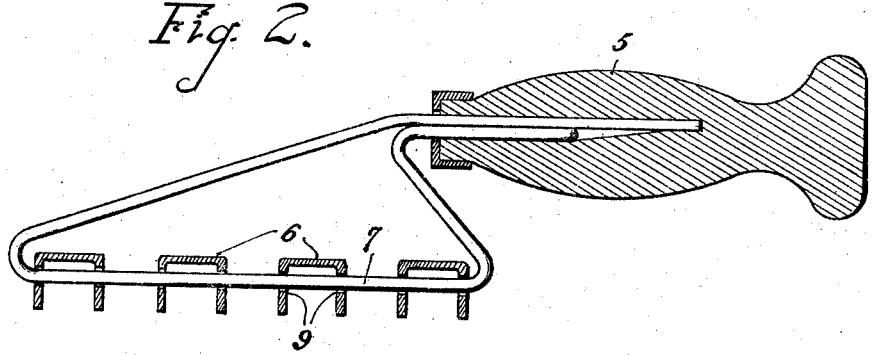

In order that the invention may be better understood, reference is had to the accompanying drawing forming a part of this specification, and in said drawing, Figure 1 is a perspective view of the device, with the handle shown in dotted lines, and Fig. 2 is a longitudinal section.

Referring specifically to the drawing, 5 denotes the handle of the comb, the same carrying the frame which supports the comb bars 6. This frame is composed of two pieces of wire which are bent to form two parallel, laterally spaced supporting rods 7 for the comb bars, the handle 5 being secured to the wires in any suitable manner which is immaterial to the present invention.

The comb bars 6 are U-shaped in cross section to produce two depending, parallel and spaced flanges having serrated edges as shown at 8. In the flanges are alined apertures 9 by which the bars are mounted on the rods 7, the latter passing through the apertures.

The bars 6 are loose on the rods 7, and they are therefore free to slide back and forth along the same. The bars are not set closely together on the rods, there being enough space between them to allow each a limited sliding movement on the rods.

By having the comb bars 6 loose and slidable on the supporting rods 7, said bars are rendered practically self-cleaning, as dirt, hair and trash is prevented from accumulating thereon, and it is not necessary to stop and knock the same out of the comb as with curry-combs of the conventional type having fixed comb bars. The comb is also light, and as the accumulation of trash is prevented, it is easier to curry the animal, and the work can also be done a great deal quicker.

I claim:

1. A curry-comb comprising a series of comb bars, and supporting rods on which said bars are slidably mounted.

2. A curry-comb comprising parallel and laterally spaced supporting rods, and comb bars having depending flanges, the edges of which are serrated, and said flanges having alined apertures through which the rods pass, the bars being loose on the rods and free to slide thereon.

In testimony whereof I affix my signature.

GIPSON TAYLOR AYER.

Witnesses:
A. J. BURNSIDE,
HENRY CLAY GRIFFIN, Jr.

Copies of this patent may be obtained for five cents each, by addressing the "Commissioner of Patents, Washington, D. C."